Feb. 9, 1937. C. DOM ET AL 2,070,005
SPRING NUT
Filed Jan. 30, 1935
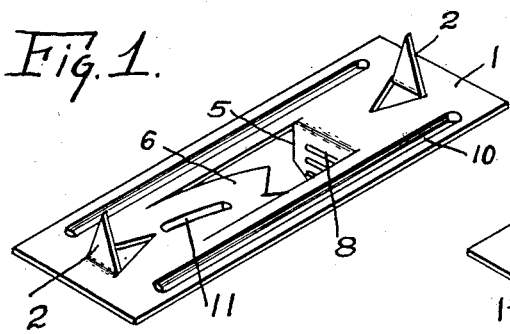
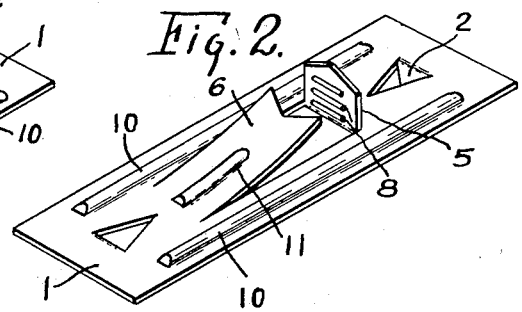
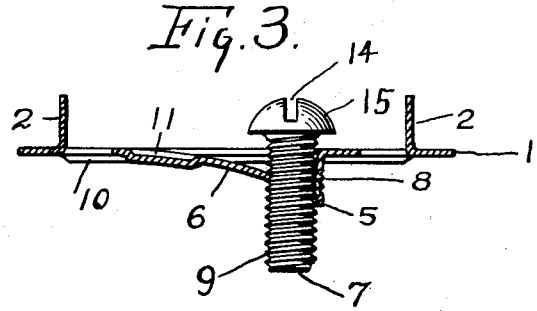
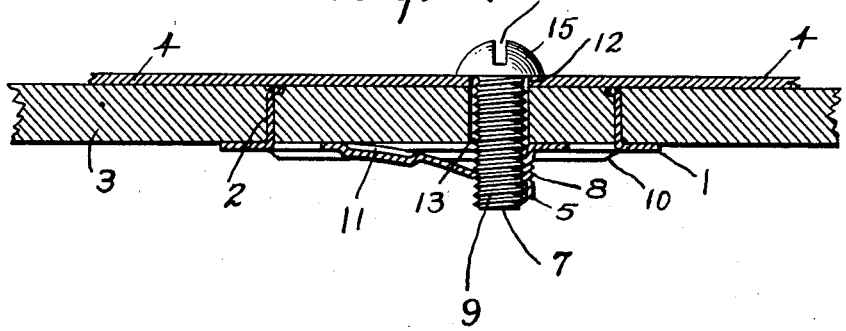
Inventors
Chesley Dom
William J. Moeller
By Geo. W. Mills Jr.
Attorney Patented Feb. 9, 1937

2,070,005

UNITED STATES PATENT OFFICE 2,070,005

SPRING NUT

Chesley Dom, Pleasant Ridge, and William J. Moeller, Mount Healthy, Ohio, assignors to The Philip Carey Manufacturing Company, a corporation of Ohio Application January 30, 1935, Serial No. 4,100

20 Claims. (Cl. 85—36)

This invention relates to a spring nut which is preferably adapted to be attached to some attachable member that is desired to be secured to a base support and particularly pertains to a nut having means thereon to permit its speedy and quick assembly with a stud which is to be employed in association therewith for securing the attachable member to the base member.

Generally described the invention comprises a blank of some such material, typified by sheet metal, having anchoring tongues or prongs stamped or struck therefrom to project from one face whereby said blank is adapted to be secured to any member that is to be attached to a base support. Stud engaging tongues or prongs are struck or stamped from the blank to extend from the face opposite to those of the anchoring studs and are so arranged that a holding stud may be inserted between the stud engaging tongues and be engaged thereby. One of the tongues is disposed in position to provide a support against which the stud is adapted to rest and the other tongue is arranged to impinge against the stud and hold same against the first mentioned stud engaging tongue. The stud may be readily inserted between the tongue engaging prongs and be engaged thereby and thus the spring nut may readily be employed with any member that is desired to be attached in position on a base support by having it positioned on said member to receive a stud projected through the base member. The attachable member is recessed whereby the stud may be inserted therethrough and the spring nut is fastened to the attachable member with the stud engaging tongues or prongs arranged in alignment with the recess. The base member is recessed and accordingly when the attachable member is positioned with its recess in alignment with that of the recess in the base member a stud device may be readily inserted through the base and attachable member to engage with the tongue engaging prongs of the spring nut and secure the parts in assembled relation.

For a better understanding of the invention, reference may be made to the accompanying drawing in which;

Figure 1 is a perspective view of a spring nut embodying the invention;

Figure 2 is another perspective view similar to Figure 1 but with the opposite side uppermost;

Figure 3 is a longitudinal sectional view of the spring nut showing a screw stud associated therewith and;

Figure 4 is a longitudinal sectional view of the spring nut assembled on the attachable member which is attached to a base member.

Referring specifically to the drawing in which like numerals are used to designate like parts, numeral 1 designates a sheet metal blank having anchoring tongues or prongs 2 struck therefrom and bent at right angles to project from one face whereby the spring nut may be anchored to attachable member 3 which is desired to be secured to a base support 4. Any number of these tongues may be provided, but ordinarily one disposed on each end of the blank is sufficient. The attachable member 3 is preferably of fibrous or some such non-metallic material, which may be waterproofed by any suitable means, if desired, and the blank 1 may be attached to the attachable member 3 by having the tongues 2 partially embedded in member 3 or preferably the tongues or prongs 2 may extend entirely through the thickness of the member 3 and then bent over or clinched on the opposite side.

Preferably at an intermediate portion of the blank 1 stud engaging tongues 5 and 6 may also be stamped or struck out. These project from the face opposite to that on which the anchoring tongues 2 project. One of the stud engaging prongs, that designated as 5, is preferably bent at a right angle or perpendicularly to the blank in order to provide elongated back rest or support against which the stud 7 is adapted to rest. This prong or tongue 5 is also preferably provided with knurls 8 in order to receive the threads 9 which are preferably provided on the stud 7. These knurls function to reinforce the prong or tongue and to provide a more positive contact with the screw-threaded portion of the stud 7 and also function to hold the stud in place. While shown as parallel disposed, it will be understood that they may be arranged in any desired way and be of any desired form. The other tongue or prong engaging member 6 is bent at a slight angle to the blank and is flexed out of position as the stud is inserted in the recess between the stud engaging tongues or prongs 5 and 6, tongue or prong 6 being sufficiently resilient to impinge against the stud and resiliently hold it clamped against the other tongue or prong 5.

The adjacent ends of the two tongues 5 and 6 may be severed apart without removing any intervening portion of the blank and with the adjacent ends thereof having complementary tongue and recess of any desired contour. It is preferred that the end of the supporting tongue 5 be provided with the projection and this may advantageously be convex to provide the longest dimension of the tongue on a medial line parallel with the surface of the stud. This will also result in providing a concave recess on the end of the impinging tongue 6 conforming substantially to the contour of the stud.

Inasmuch as the blanks are made from relatively thin and flexible sheet metal, it is preferable to reinforce them to give them a greater degree of rigidity, and this may preferably be effected by any number of embossments such as 10 and 11. Embossments 10 are preferably formed along the two side edges and the embossment 11 may preferably be formed at the base of the tongue 6 where it merges with the blank 1. The embossment 11 helps to stiffen the tongue 6 as well as stiffening the blank. Similar and additional embossments may be provided either on the blank and on any of the prongs or tongues wherever desired.

The spring nut is adapted for any use where it is desired to attach a member to a support. The support 4 is provided with a recess 12 through which the stud 7 is adapted to project. The spring nut is secured to the attachable member 3 by having the tongues or prongs 2 anchored therein with the stud engaging prongs arranged over the recess 13 in the attachable member 3. Accordingly the member 3 may be readily brought in place and assembled with the base 4 by slipping the attachable member with the spring nut thereon over the threaded portion of the stud. The screw-threaded portion of the stud is readily and securely gripped by the resilient tongue 6 which impinges against the stud and holds it against the back rest or support 5. When it is desired to disassemble the member the stud may be rotated by means of a suitable tool such as a screw driver, said stud being formed with a slot 14 in the head 15 whereby it may be readily turned.

From the above description it will be obvious that by use of the spring nut any member, typified by attachable member 3 may be readily and quickly attached to a base support such as 4. The assembly may be made with rotation of the stud and the screw threads are used primarily for disassembly. While screw threads are preferable for this purpose it will be appreciated that the stud may be plain or smooth, or be provided with other form of knurls. Moreover, it will be appreciated that while the spring nut is preferably provided with anchoring tongues or prongs 2, these are optional and may be dispensed with where it is not deemed preferable to have the nut anchored to the member 3.

The stud engaging tongues or prongs 5 and 6 lock the stud in place so that it may not work loose or be removed without the use of some tool. The perpendicularly disposed tongue or prong 5 provides an elongated support which guides the stud in place and keeps it straight.

The nuts are preferably fabricated from a strip or ribbon of indefinite length having the blanks struck thereon and then subsequently severed from the strip. This is typified by an elongated strip having scored, perforated or similar dividing lines formed on the strip at the same time that the tongue and reinforcing embossments are formed. The scored strip may be readily bent on the score lines to sever the individual nuts which are then packaged for subsequent use. Or the strips may be divided with units or lengths containing several nuts, for example ten or fifteen, for shipment, and then these units or lengths may at the place of use be divided along the score lines into individual nuts.

While we have described one preferred embodiment in detail as to construction, it will be apparent that there may be various changes without departing from the spirit of the invention.

We claim:

1. A securing nut comprising a metal blank having means for anchoring same to a base member, and a stud engaging means, comprising two contiguously stamped out tongues, one of which is bent perpendicularly to the blank and parallel to the longitudinal surface of the stud to provide a plurality of points of contact with a stud and the other of which is inclined at an angle to the blank to impinge against the stud and hold same against the perpendicular tongue.

2. A securing nut comprising a metal blank having means for anchoring same to a base member, and a stud engaging means comprising two contiguously stamped out tongues, one of which is arranged perpendicularly to the blank and parallel to the longitudinal surface of the stud to provide a back support having a plurality of contacts for the stud and the other of which is inclined at an angle to the blank to impinge resiliently against the stud and hold same against the perpendicular tongue.

3. A securing nut comprising a metal blank having anchoring tongues stamped therefrom to project from one side, and stud engaging tongues stamped therefrom to project from the opposite side, one of the stud engaging tongues being provided with knurls on the stud engaging portion.

4. A securing nut comprising a metal blank having contiguous tongues stamped therefrom to provide a recess through which a stud is adapted to project and be engaged by said tongues, one of said tongues being disposed perpendicularly to the blank and parallel to the longitudinal surface of the stud to provide an elongated back stop having a plurality of contacting points for the stud and the other tongue being disposed at an angle to the blank to impinge the stud against the perpendicular tongue.

5. A securing nut comprising a metal blank having contiguous tongues stamped therefrom to provide a recess through which a screw-threaded stud is adapted to project and be engaged by said tongues, one of said tongues being disposed perpendicularly to the blank and parallel to the longitudinal surface of the stud and provided with knurls and the other tongue being disposed at an angle to the blank to impinge the stud against the perpendicular tongue.

6. In combination with a base member and a screw-threaded stud associated therewith, a readily attachable member having secured thereto a spring nut comprising a metal blank having tongues stamped from one side to anchor with the attachable member and tongues stamped from the opposite face to engage with the stud, one of the stud engaging tongues being disposed perpendicularly to the blank and parallel to the longitudinal surface of the stud to provide an elongated back having a plurality of points of contact for the stud and the other tongue being disposed at an angle to the blank to impinge against the stud and hold same against the perpendicular tongue.

7. In combination with a base member and a screw-threaded stud associated therewith, a readily attachable member having secured thereto a spring nut comprising a metal blank having tongues stamped from one side to anchor with the attachable member and tongues stamped from the opposite face to engage with the stud, one of the stud engaging tongues being disposed perpendicularly to the blank and parallel to the longitudinal surface of the stud and knurled and the other tongue being disposed at an angle to the blank to impinge against the stud and hold same against the perpendicular stud.

8. A securing nut comprising a metal blank having means for anchoring same to a base member and a stud engaging means comprising a stamped out tongue having an elongated back rest portion parallel to the longitudinal surface of the stud providing a plurality of contacting points for aligning the stud and means to hold the stud against the back rest portion of the tongue.

9. A securing nut comprising a metal blank having means for anchoring same to a base member and a stud engaging means comprising two contiguously stamped out tongues, one of which is bent to provide an elongated back rest portion parallel to the longitudinal surface of the stud providing a plurality of contacting points for aligning the stud and the other of which is adapted to hold the stud against the back rest portion of the first mentioned tongue.

10. A securing nut comprising a metal blank having means for anchoring same to a base member and a stud engaging means comprising a stamped out tongue having an elongated back rest portion parallel to the longitudinal surface of the stud providing a plurality of contacting points for guiding a stud in place and align same and means stamped from the blank to hold the stud against the back rest portion of the tongue.

11. A securing nut comprising a metal blank having means for anchoring same to a base member and a stud engaging means comprising two contiguously stamped out tongues, one of which is provided with an elongated back rest portion parallel to the longitudinal surface of the stud providing a plurality of contacting points for guiding a stud in place and align same and the other of which is disposed at an angle to the longitudinal surface of the stud and adapted to hold the stud against the back rest portion of the first mentioned tongue.

12. A securing nut comprising a metal blank having contiguous tongues stamped therefrom to provide a recess through which a screw threaded stud is adapted to project and be engaged by said tongues, one of said tongues being disposed perpendicular to the blank and parallel to the longitudinal surface of the stud having a plurality of contacting points and provided with knurls spaced to engage the thread on the stud and the other tongue being disposed at an angle to the blank having an end of such thickness to fit in the thread groove of the stud to impinge same against the perpendicular tongue.

13. A securing nut comprising a metal blank having contiguous tongues stamped therefrom to provide a recess through which a screw threaded stud is adapted to project and be engaged by said tongues, one of said tongues extending from the margin of the recess and being provided with knurls spaced to engage the thread on the stud and the other tongue being disposed at an angle to the blank having an end of such thickness to fit in the thread groove of the stud to impinge same against the knurled tongue.

14. A securing nut comprising a metal blank having contiguous tongues stamped therefrom to provide a recess through which a screw threaded stud is adapted to project and be engaged by said tongues, one of said tongues being disposed perpendicular to the blank and parallel to the longitudinal surface of the stud having a plurality of contacting points and provided with knurls spaced to engage the thread on the stud and the other tongue being disposed at an angle to the blank having the end of such thickness as to fit in the thread groove of the stud to impinge same against the perpendicular tongue and reinforcing beads formed in the blank.

15. A device for securing a plurality of articles together, said device comprising contiguous tongues, a space provided between said tongues through which a member is adapted to project and be engaged by said tongues, one of said tongues being disposed parallel to the longitudinal surface of said member and the other tongue being disposed at an oblique angle to the said parallel tongue to impinge the said member against the parallel tongue.

16. A device for securing a plurality of articles together, said device comprising contiguous tongues, a space provided between said tongues through which a member is adapted to project and be engaged by said tongues, one of said tongues being disposed parallel to the longitudinal surface of said member and the other tongue being disposed at an oblique angle to the said parallel tongue to impinge the said member against the parallel tongue by contacting said member on a side, removed from the side contacting the parallel tongue, at a point on said removed side which is within the same longitudinal dimension as the line of contact between the parallel tongue and said member.

17. A device for securing a plurality of articles together provided with two contiguous tongues, a member adapted to be inserted between said tongues, one of said tongues having an aligning surface adapted to contact the side of the said member at a plurality of points along its longitudinal surface, the other tongue being disposed adjacent the first mentioned tongue and sufficiently yieldable to permit said member to be inserted non-rotatably and adapted to hold said member against the first mentioned tongue for aligning and locking said member in predetermined position.

18. A device for securing a plurality of articles together provided with two contiguous tongues, a member adapted to be inserted between said tongues, one of said tongues having an aligning surface adapted to contact the side of the said member at a plurality of points along its longitudinal surface, the other tongue being disposed adjacent the first mentioned tongue and sufficiently yieldable to permit said member to be inserted non-rotatably and adapted to hold said member against the first mentioned tongue and align said member in predetermined position.

19. A device for securing a plurality of articles together provided with two contiguous tongues, a member adapted to be inserted between said tongues, one of said tongues having a portion bent to form an aligning surface adapted to contact the side of the said member at a plurality of points along its longitudinal surface, the other tongue being disposed adjacent the first mentioned tongue and sufficiently yieldable to permit said member to be inserted non-rotatably and adapted to hold said member against the first mentioned tongue in predetermined aligned locked position.

20. A securing nut comprising a metal blank having a stud engaging means comprising a stamped out tongue having an elongated back rest portion parallel to the longitudinal surface of the stud providing a plurality of contacting points for guiding a stud in place and aligning same and means stamped from the blank to hold the stud against the back rest portion of the tongue.

CHESLEY DOM.
WILLIAM J. MOELLER.